(12) United States Patent
Chen et al.

(10) Patent No.: US 9,204,368 B2
(45) Date of Patent: Dec. 1, 2015

(54) DYNAMIC BEACON RATES AND FIXED AD HOC MODES IN AD HOC NETWORKS

(75) Inventors: Gallin Chen, Ivine, CA (US); James Graves, Roselle, IL (US); David Stewart, Ventura, CA (US)

(73) Assignees: CalAmp Corp., Oxnard, CA (US); Delta Mobile Software, Inc., Elgin, IL (US)

( * ) Notice: Subject to any disclaimer, the term of this patent is extended or adjusted under 35 U.S.C. 154(b) by 531 days.

(21) Appl. No.: 13/460,573

(22) Filed: Apr. 30, 2012

(65) Prior Publication Data

US 2013/0287010 A1 Oct. 31, 2013

(51) Int. Cl.
| | |
|---|---|
| H04W 4/00 | (2009.01) |
| H04W 48/10 | (2009.01) |
| H04W 74/08 | (2009.01) |
| H04W 84/18 | (2009.01) |
| H04W 84/12 | (2009.01) |

(52) U.S. Cl.
CPC .......... *H04W 48/10* (2013.01); *H04W 74/0816* (2013.01); *H04W 84/12* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 7,180,884 | B2* | 2/2007 | Elliott et al. | 370/338 |
| 7,564,826 | B2* | 7/2009 | Sherman et al. | 370/338 |
| 7,583,651 | B2* | 9/2009 | Yamada et al. | 370/345 |
| 7,733,842 | B2 | 6/2010 | Yang et al. | |
| 7,817,961 | B2* | 10/2010 | Sinivaara et al. | 455/41.2 |
| 7,940,711 | B2* | 5/2011 | Lee et al. | 370/311 |
| 8,184,610 | B2* | 5/2012 | Strutt et al. | 370/347 |
| 8,493,992 | B2* | 7/2013 | Sella et al. | 370/445 |
| 8,514,789 | B2* | 8/2013 | Akchurin et al. | 370/329 |
| 2008/0107089 | A1* | 5/2008 | Larsson et al. | 370/338 |
| 2008/0267121 | A1* | 10/2008 | Lee et al. | 370/329 |
| 2010/0135267 | A1* | 6/2010 | Strutt et al. | 370/338 |
| 2010/0226309 | A1* | 9/2010 | Kasslin et al. | 370/328 |
| 2012/0163349 | A1* | 6/2012 | Fontaine et al. | 370/336 |
| 2013/0077549 | A1* | 3/2013 | Chhabra et al. | 370/311 |

OTHER PUBLICATIONS

Chen et al., "Analysis and Experiments for Dual-Rate Beacon Scheduling in ZigBee/IEEE 802.15.4", First International Workshop on Cyber-Physical Networking Systems, 2011, pp. 767-772.
Iyer et al., "NetDetect: Neighborhood Discovery in Wireless Networks Using Adaptive Beacons", Source and date unknown, 10 pgs.

* cited by examiner

*Primary Examiner* — Michael J Moore, Jr.
(74) *Attorney, Agent, or Firm* — KPPB LLP

(57) ABSTRACT

Systems and methods for dynamic beacon rates and fixed ad hoc modes in ad hoc networks in accordance with embodiments of the invention are disclosed. In one embodiment of the invention, an ad hoc wireless network includes a plurality of peers configured to form an ad hoc network, wherein the plurality of peers are configured to transmit and receive beacon frames, wherein one or more of the plurality of peers is configured to be fixed in a host mode, wherein one or more of the plurality of peers is configured to be fixed in a client mode, wherein the one or more peers in host mode are configured to transmit beacon frames, where the beacon frames identify an ad hoc wireless network, and wherein a peer not connected to an ad hoc wireless network does not transmit beacon frames when in client mode.

19 Claims, 4 Drawing Sheets

DYNAMIC BEACON RATES AND FIXED AD HOC MODES IN AD HOC NETWORKS

FIELD OF THE INVENTION

The present invention generally relates to systems and methods for wireless communication and more specifically relates to systems and methods for improving performance of clients in ad hoc wireless networks.

BACKGROUND

IEEE 802.11 is a set of standards for implementing wireless local area networks (WLANs). Depending on which standard is employed, such as IEEE 802.11b, 802.11g, or 802.11n, IEEE 802.11 networks commonly operate in the 2.4, 3.6, and 5 GHz frequency bands. IEEE 802.11 divides the frequency bands into channels; for example, the 2.4000-2.4835 GHz band, utilized in IEEE 802.11b and 802.11g networks, is divided into 13 channels spaced 5 MHz apart, with channel 1 centered on 2.412 GHz and 13 on 2.472 GHz. In an 802.11b network, which utilizes 22 MHz channels, only three channels in the 2.4 GHz band do not overlap—channels 1, 6, and 11. In an 802.11g network, which utilizes 20 MHz channels, there are four non-overlapping channels: 1, 5, 9 and 13. IEEE 802.11 specifies two network modes, infrastructure mode and ad hoc mode. In the ad hoc mode, clients connected to the same WLAN communicate directly with other peers on the same WLAN to form a peer-to-peer network. In the infrastructure mode, one or more network infrastructure devices, such as wireless access points or wireless routers, are responsible for broadcasting the network; clients then connect to the network infrastructure devices to form a network and the clients communicate with each other through the network infrastructure devices.

IEEE 802.11 standards define frame types for data transmission, management, and connection control of connections in the WLAN. A beacon frame is a management frame containing information about the WLAN. Beacon frames are transmitted periodically to announce the presence of a WLAN, transmitted periodically to announce the presence of a WLAN. Beacon frames in 802.11 networks contain information about the sender and the recipient of the beacon frame along with a variety of network information including the beacon interval, a timestamp, a service set identifier (SSID) identifying the network, a description of the data rates available on the network, information concerning the signaling methods utilized in the network, the capability information of the network, and in some beacon frames, a traffic indication map. In ad hoc networks, each network client, also known as a peer, generates beacon frames. The time between beacon frame transmissions is known as the beacon interval. In an ad hoc network, one peer configures itself to send the beacon frame. After receiving a beacon frame, the other peers wait for the beacon interval and then broadcast a beacon frame if no other station has done so within the beacon interval plus a random amount of additional time, ensuring that at least one peer will send a beacon frame and that the beacon frame transmission responsibilities are shared amongst the peers in a WLAN. In an infrastructure network, the network infrastructure devices are responsible for transmitting beacon frames. In the event that the network infrastructure devices are unavailable, the network is inaccessible to network clients.

SUMMARY OF THE INVENTION

Systems and methods for dynamic beacon rates and fixed ad hoc modes in ad hoc networks in accordance with embodiments of the invention are disclosed. In one embodiment of the invention, an ad hoc wireless network includes a plurality of peers configured to form an ad hoc network, where a peer comprises an antenna, an analog front end, a processor, beacon frame storage configured to store beacon frames, wherein the plurality of peers are configured to transmit and receive beacon frames, where the beacon frames identify an ad hoc wireless network, wherein one or more of the plurality of peers is configured to be fixed in a host mode, wherein one or more of the plurality of peers is configured to be fixed in a client mode, wherein the one or more peers in host mode are configured to transmit beacon frames, where the beacon frames identify an ad hoc wireless network, and wherein a peer not connected to an ad hoc wireless network does not transmit beacon frames when in client mode.

In another embodiment of the invention, a peer not connected to the ad hoc network is configured to receive a beacon frame and connect to the ad hoc network using information from the beacon frame and the peer is configured to transmit beacon frames after connecting to the ad hoc wireless network.

In an additional embodiment of the invention, the plurality of peers are configured to adjust their beacon rate utilizing a network beacon rate determined utilizing received beacon frames.

In yet another additional embodiment of the invention, the determined network beacon rate is the highest network beacon rate.

In still another additional embodiment of the invention, the adjusted beacon rate is higher than the determined network beacon rate.

In yet still another additional embodiment of the invention, the adjusted beacon rate is equivalent to the determined network beacon rate.

In yet another embodiment of the invention, the adjusted beacon rate is lower than the determined network beacon rate.

In still another embodiment of the invention, each of the plurality of peers include a beacon interval storage configured to store a beacon interval, wherein the plurality of peers are configured to adjust the stored beacon interval based upon received beacon frames.

In yet still another embodiment of the invention, the beacon interval is contained in a received beacon frame.

In yet another additional embodiment of the invention, the beacon interval is determined by measuring the time between receiving a first beacon frame and a second beacon frame.

In still another additional embodiment of the invention, the adjusted beacon interval is longer than a network beacon rate determined utilizing the received beacon frames.

In yet still another additional embodiment of the invention, the adjusted beacon interval is shorter than a network beacon rate determined utilizing the received beacon frames.

In yet another embodiment of the invention, the adjusted beacon interval is infinite.

Still another embodiment of the invention includes dynamically adjusting the beacon rate of a peer in an ad hoc network, including receiving beacon frames using a peer, storing beacon frames using the peer, determining the network beacon rate using the peer, adjusting the beacon rate stored using the peer, and transmitting a beacon frame using the peer when a beacon frame is not received during a period of time greater than the adjusted beacon rate.

In yet another additional embodiment of the invention, the determined network beacon rate is the highest network beacon rate.

In still another additional embodiment of the invention, the adjusted beacon rate is higher than the determined network beacon rate.

In yet still another additional embodiment of the invention, the adjusted beacon rate is equivalent to the determined network beacon rate.

In yet another embodiment of the invention, the adjusted beacon rate is lower than the determined network beacon rate.

Still another embodiment of the invention includes dynamically adjusting the beacon rate of a peer in an ad hoc network, including receiving beacon frames using the peer, storing beacon frames using peer, determining the network beacon rate using the peer, adjusting the beacon interval using the peer, and maintaining a connection to other peers connected to the ad hoc wireless network during the adjusted beacon interval.

In yet another additional embodiment of the invention, the adjusted beacon interval is longer than the determined network beacon rate.

In still another additional embodiment of the invention, the adjusted beacon interval is shorter than the determined network beacon rate.

In yet still another additional embodiment of the invention, the adjusted beacon interval is infinite.

DETAILED DESCRIPTION

Turning now to the drawings, systems and methods for dynamic beacon rates and fixed ad hoc modes in ad hoc networks are illustrated. Although ad hoc networks allow peers to quickly find each other and transfer data, there are several issues that limit the effectiveness of ad hoc networks in practice. First, when beacon frames are not transmitted in expected beacon intervals, peers may drop off an ad hoc network and become invisible to other peers in the ad hoc network. This dropping off of peers in an ad hoc network is particularly prevalent when creating ad hoc networks of devices from a variety of manufacturers. When peers in an ad hoc network are invisible to other peers in the network, the effectiveness of the ad hoc network is diminished or eliminated.

In many applications, it is desirable to create an ad hoc network in locations where network infrastructure is unavailable. In these ad hoc networks, it is often useful to have specific devices act as "hosts" for the ad hoc network. Host clients are responsible for broadcasting beacon frames indicating the presence of the ad hoc network. In ad hoc networks, if a peer in client mode does not detect a host peer, the peer in client mode will switch to host mode. This can cause confusion in the ad hoc network as other peers in client mode may connect to a peer in host mode which is not intended to be a peer in host mode, limiting the effectiveness of the ad hoc network. In accordance with the invention, having peers fixed in host mode or client mode can reduce the effect of this limiting behavior, improving performance of the ad hoc network.

These limitations of ad hoc networks can be overcome utilizing dynamic beacon rates and fixed ad hoc modes. In a number of embodiments, peers analyze the beacon frame activity of an ad hoc network and dynamically adjust their beacon rate. In many embodiments, peers have a fixed host or client mode defining their role in an ad hoc network. Systems and methods for dynamic beacon rates and fixed ad hoc modes in ad hoc networks in accordance with embodiments of the invention are discussed below.

Ad Hoc Wireless Network

Figure 1:
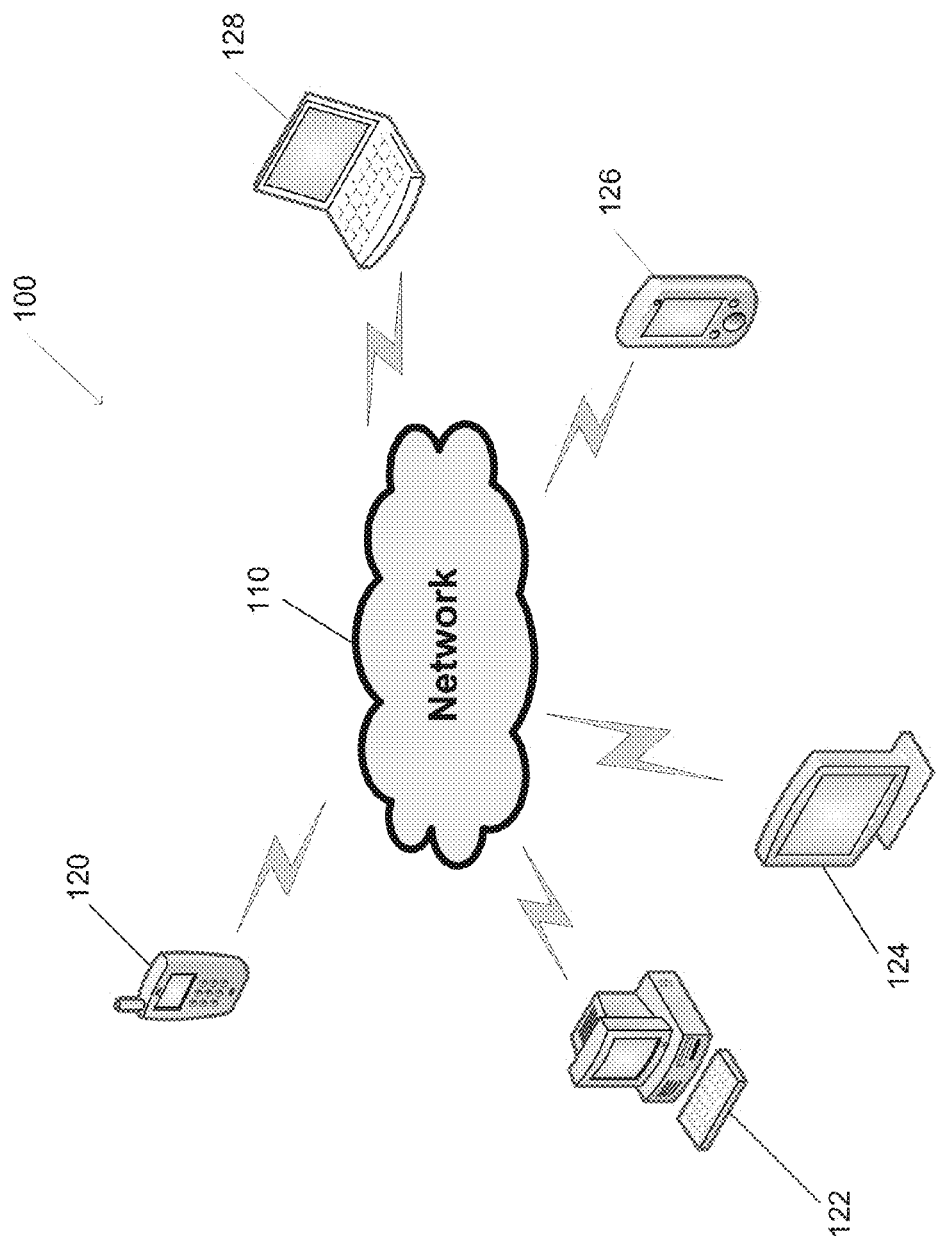
FIG. 1 is a diagram of a system for an ad hoc wireless network in accordance with an embodiment of the invention.

An ad hoc network of devices in accordance with an embodiment of the invention is illustrated in FIG. 1. The ad hoc network 100 includes a wireless network 110 created by a plurality of peers connecting to each other. Peers include devices such as smartphones 120, personal computers 122, smart devices 124, tablets 126, and laptops 128. In several embodiments of the invention, peers include any device capable of creating an ad hoc network amongst them. In a number of embodiments, the wireless network 110 is an IEEE 802.11 network. In other embodiments, any of a variety of appropriate ad hoc networking protocols can be utilized to communicate between peers in the ad hoc network.

Although a specific architecture for an ad hoc network is illustrated in FIG. 1, any variety of peer devices and networking technologies may be utilized to create ad hoc networks in accordance with embodiments of the invention. Systems and methods for implementing a peer device for use in an ad hoc network in accordance with embodiments of the invention are discussed further below.

Ad Hoc Peers

Figure 2:
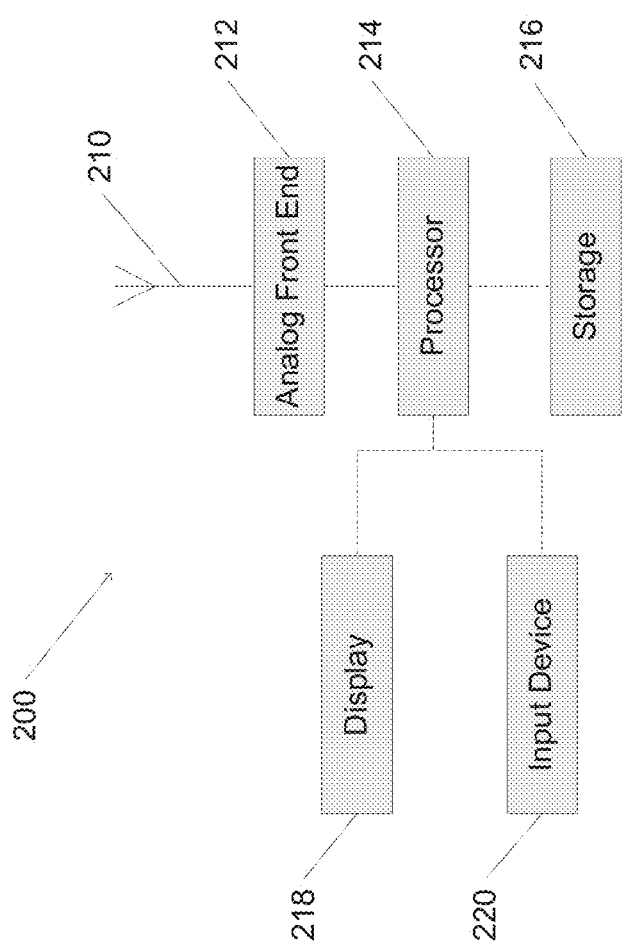
FIG. 2 is a diagram of an ad hoc client in accordance with an embodiment of the invention.

Ad hoc networks are created by peers transmitting beacon frames, which are received by other peers, which connect to the network identified by the transmitted beacon frames, forming an ad hoc network. A peer in an ad hoc network in accordance with an embodiment of the invention is illustrated in FIG. 2. A peer 200 contains an antenna 210. In many embodiments of the invention, the antenna is tuned to transmit and receive signals based on an IEEE 802.11 standard. The antenna is connected to an analog front end 212. The peer further contains a processor 214. In many embodiments, the analog front end is implemented utilizing the processor 214. In many embodiments, the peer 200 supports a low-power operating mode.

In several embodiments, the peer 200 contains storage 216. In a number of embodiments, the processor 214 is configured to receive and store data utilizing the storage 216. In several embodiments, the stored data includes information utilized to participate in an ad hoc network, such as network beacon rates and the SSID of the network. In many embodiments, the processor 214 is connected to a display capable of displaying information. In a number of embodiments, the processor 214 is connected to an input device 220, such as a touchscreen, keyboard, and/or mouse. In many embodiments, the input device 220 is a sensor capable of collecting information. The processor is connected to a plurality of input devices 220 in several embodiments of the invention.

Although a specific architecture for a peer in an ad hoc network is shown in FIG. 2, other implementations appropriate to specific applications can be utilized in accordance with embodiments of the invention. Methods of operation of peers in an ad hoc network in accordance with embodiments of the invention are discussed further below.

Dynamically Adjusting Beacon Rates

Figure 3:
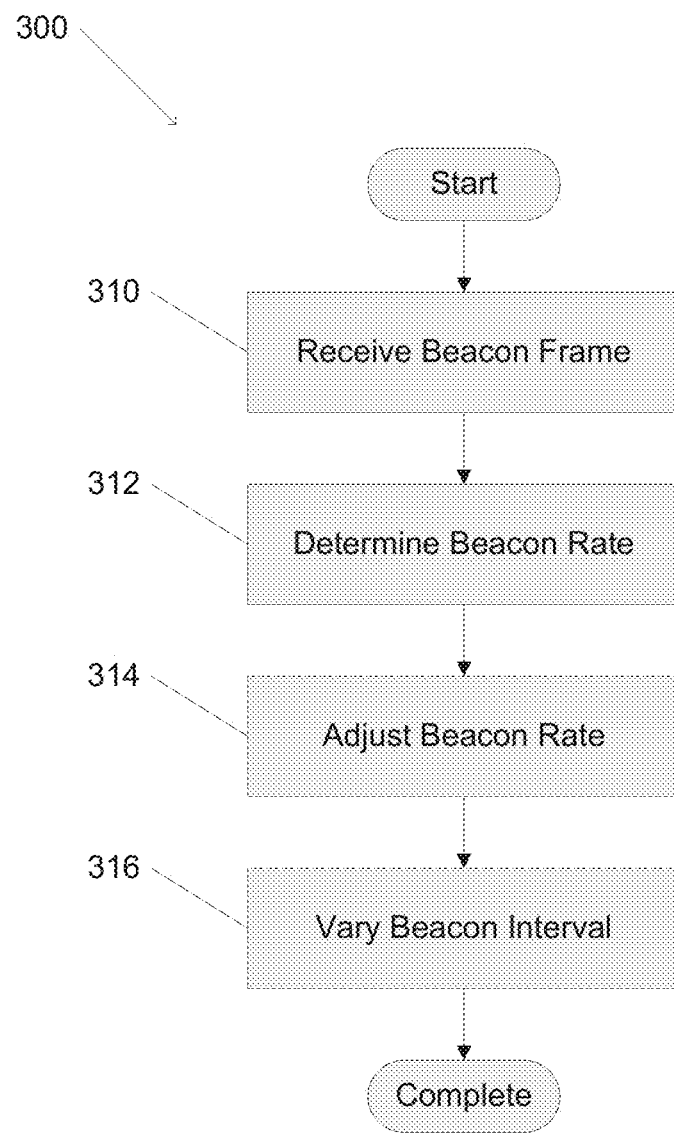
FIG. 3 is a flow chart illustrating a process for dynamically adjusting the beacon rate for an ad hoc client in accordance with an embodiment of the invention.

Peers in an ad hoc network with fixed beacon rates are prone to dropping off the ad hoc network when other peers utilize a different (higher) beacon rate. If there is any mismatch in the rate at which ad hoc peers transmit beacon frames at, the ad hoc peers transmitting beacon frames at slower rates are likely to drop off the ad hoc network. In accordance with an embodiment of the invention, this problem can be limited by dynamically determining a beacon rate based on the beacon rates used by the other peers in the ad hoc network in the beacon frames received by the peer. A method for dynamically determining beacon rates in accordance with an embodiment of the invention is illustrated in FIG. 3. The method 300 includes receiving (310) a beacon frame. The network beacon rate is determined (312). In several embodiments, the network beacon rate is determined (312) utilizing one or more beacon frames. In many embodiments, the network beacon rate (312) is determined by averaging the rate at which beacon frames are received from an ad hoc peer. In a number of embodiments, the peer adjusts (314) its beacon rate. In many embodiments, the adjustment (314) of the beacon rate utilizes the network beacon rate. In several embodiments, the beacon interval is varied (316). In a number of embodiments, the varying (316) of the beacon interval utilizes the network beacon rate.

The adjustment (314) of the beacon rate involves a variety of factors, including balancing the transmission rate of other peers with the transmission rate of the peer dynamically adjusting its beacon rate. In a number of embodiments, other peers may be peers in host mode or peers in client mode. In many embodiments, it is desirable to adjust (314) the beacon rate so that the peer remains visible to other peers while not broadcasting so many beacon frames as to drown out the other peers. In several embodiments, the adjustment (314) of the beacon rate includes power management concerns. In a number of embodiments, the beacon rate is adjusted (314) to be equivalent to, or slightly higher or lower than, the most frequent beacon rate on the network. In several embodiments, varying (316) the beacon rate interval involves adjusting the beacon interval based on the frequency that a given peer is expected to broadcast a beacon frame. In many embodiments, the beacon interval may be effectively infinite. In a number of embodiments, the beacon interval is determined by recoding the lowest beacon interval from an ad hoc peer over a period of time, such as five minutes. In several embodiments, the beacon interval is an integer fraction of one second.

Although a method for dynamically determining beacon rates in accordance with an embodiment of the invention is discussed above, a variety of methods for dynamically determining beacon rates may be utilized in accordance with embodiments of the invention. Methods for fixing ad hoc modes in accordance with embodiments of the invention are discussed below.

Emulating Infrastructure Networks Utilizing Fixed Ad Hoc Modes

Figure 4:
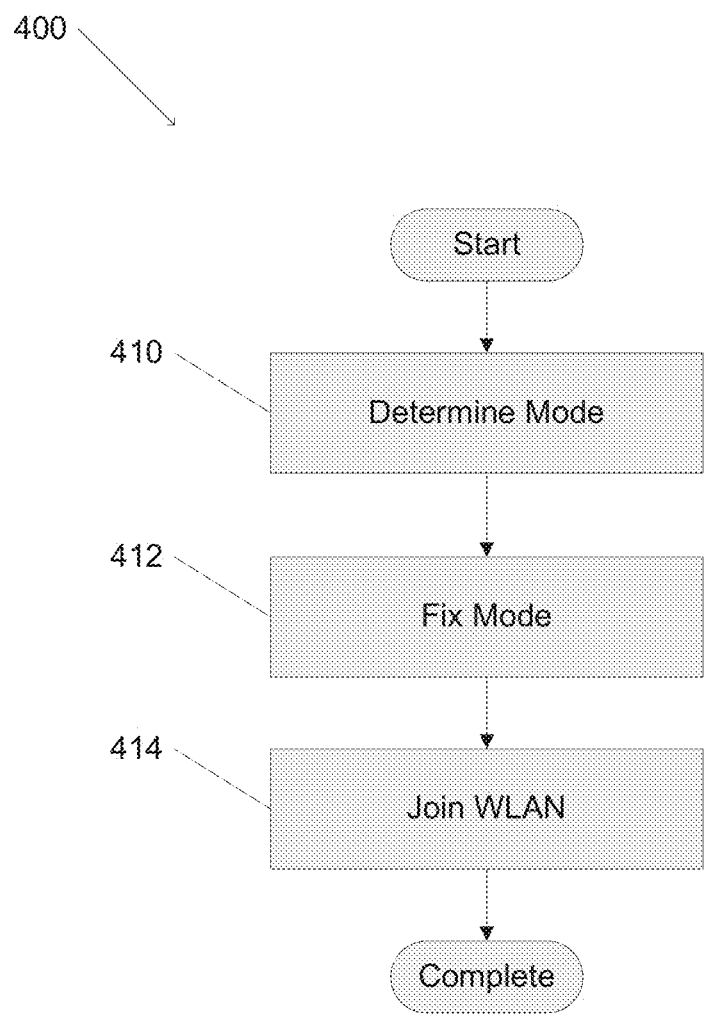
FIG. 4 is a flow chart illustrating a process for emulating an infrastructure WLAN utilizing fixed ad hoc modes in accordance with an embodiment of the invention.

Many situations exist where an infrastructure WLAN is desired; however, the necessary hardware to support an infrastructure WLAN does not exist in that location. A process for emulating an infrastructure WLAN utilizing an ad hoc network is illustrated in FIG. 4. The process 400 involves determining (410) the desired mode for a peer. In a number of embodiments, peers are in either host mode or client mode. In many embodiments, peers in host mode broadcast beacon frames announcing the ad hoc network; peers in client mode listen for beacon frames and connect to the announced ad hoc network when the beacon frames are received. The mode is fixed (412). In several embodiments, fixing (412) the mode prohibits the peer from changing its mode from client mode to host mode or vice versa. A WLAN is joined (414). In many embodiments, peers in client mode connect to peers in host mode. In several embodiments, the WLAN utilizes an IEEE 802.11 standard.

One issue with ad hoc networks is when peers are in host mode, peers in client mode may connect to the peers in host mode. However, when emulating an infrastructure WLAN, it is desirable to have certain peers always act as hosts in order to present a consistent network experience to all peers in client mode. In many embodiments, fixing (412) modes of peers limits peers in client mode from switching to host mode. This helps peers in client mode join (414) the correct wireless network broadcast by the peers in host mode, and avoids the situation that might otherwise occur in which a peer in client mode switches to host mode creating multiple ad hoc networks with the same name. In a number of embodiments, a peer in client mode is configured to transmitting beacon frames once a WLAN is joined (414).

A specific process for emulating an infrastructure WLAN utilizing fixed ad hoc modes is described above; however, a variety of processes, including those with other peer modes and those networks not based on an IEEE 802.11 standard, could be utilized in accordance with embodiments of the invention. Although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive. Accordingly, the scope of the invention should be determined not by the embodiments illustrated, but by the appended claims and their equivalents.

What is claimed is:

1. An ad hoc wireless network, comprising:
    a plurality of peers directed to form an ad hoc network, where a peer comprises an antenna, an analog front end, a processor, and beacon frame storage directed to store beacon frames;
    wherein a peer in the plurality of peers:
        receives beacon frames, where the beacon frames identify an ad hoc wireless network;
        determines a network beacon rate of the ad hoc network based on a rate at which beacon frames are received;
        transmits beacon frames based on the network beacon rate of the ad hoc network; and
    wherein at least one peer in the plurality of peers has a beacon rate that differs from a beacon rate for a second peer in the plurality of peers;
    wherein one or more of the plurality of peers is directed to be fixed in a host mode that prohibits a peer from changing its mode from host mode to client mode;
    wherein one or more of the plurality of peers is directed to be fixed in a client mode that prohibits a peer from changing its mode from client mode to host mode;
    wherein a peer in the one or more peers is directed to transmit beacon frames by:
        dynamically adjusting its beacon rate based on beacon frame activity of the ad hoc network;
        determining a beacon interval based on the adjusted beacon rate;
        waiting a time period calculated based on the beacon interval; and when a beacon frame has not been received during the calculated time period, transmit at least one beacon frame based on the adjusted beacon rate;
wherein the peers in the plurality of peers not connected to an ad hoc wireless network do not transmit beacon frames when in client mode; and
wherein a peer in client mode that is not connected to the ad hoc network is directed to receive a beacon frame and connect to the ad hoc network using information from the beacon frame.

2. The ad hoc wireless network of claim 1, wherein the peers in client mode are directed to transmit beacon frames after connecting to the ad hoc wireless network.

3. The ad hoc wireless network of claim 1, wherein the plurality of peers are directed to adjust their beacon rate utilizing the network beacon rate determined utilizing received beacon frames.

4. The ad hoc wireless network of claim 3, wherein:
the determined network beacon rate is the highest network beacon rate.

5. The ad hoc wireless network of claim 3, wherein the adjusted beacon rate is higher than the determined network beacon rate.

6. The ad hoc wireless network of claim 3, wherein the adjusted beacon rate is equivalent to the determined network beacon rate.

7. The ad hoc wireless network of claim 3, wherein the adjusted beacon rate is lower than the determined network beacon rate.

8. The ad hoc wireless network of claim 1, wherein each of the plurality of peers include a beacon interval storage directed to store a beacon interval, wherein the plurality of peers are directed to adjust the stored beacon interval based upon received beacon frames.

9. The ad hoc wireless network of claim 8, wherein the beacon interval is contained in a received beacon frame.

10. The ad hoc wireless network of claim 8, wherein the beacon interval is determined by measuring a time period between receiving a first beacon frame and a second beacon frame.

11. The ad hoc wireless network of claim 8, wherein the adjusted beacon interval is longer than a network beacon interval determined utilizing the received beacon frames.

12. The ad hoc wireless network of claim 8, wherein the adjusted beacon interval is shorter than a network beacon interval determined utilizing the received beacon frames.

13. A method for dynamically adjusting a beacon rate of a peer in an ad hoc network, comprising:
receiving beacon frames using a peer, where:
a peer not connected to the ad hoc network is configured directed to receive a beacon frame and connect to the ad hoc network using information from the beacon frame;
a peer directed to be fixed in a host mode is prohibited from changing its mode from host mode to client mode;
a peer directed to be fixed in a client mode (i) is prohibited from changing its mode from client mode to host mode and (ii) when not connected to an ad hoc wireless network, does not transmit beacon frames when in client mode:
determining a network beacon rate of an ad hoc network based on a rate at which beacon frames are received using the peer;
adjusting a beacon rate to calculate an adjusted beacon rate based on the network beacon rate using the peer;
determining a beacon interval based on the adjusted beacon rate;
transmitting at least one beacon frame based on the adjusted beacon rate using the peer when a beacon frame is not received during a period of time greater than the beacon interval of the adjusted beacon rate, where the peer transmits beacon frames after connecting to the ad hoc wireless network and the peer transmits beacon frames by:
waiting a time period calculated based on the beacon interval of the adjusted beacon rate; and
when a beacon frame has not been received during the calculated time period, transmit at least one beacon frame based on adjusted beacon rate.

14. The method of claim 13, wherein:
the determined network beacon rate is the highest network beacon rate.

15. The method of claim 13, wherein the adjusted beacon rate is higher than the determined network beacon rate.

16. The method of claim 13, wherein the adjusted beacon rate is equivalent to the determined network beacon rate.

17. The method of claim 13, wherein the adjusted beacon rate is lower than the determined network beacon rate.

18. The method of claim 13, further comprising maintaining a connection to the other peers connected to the ad hoc wireless network during the beacon interval.

19. The ad hoc wireless network of claim 1, wherein dynamically adjusting a beacon rate comprises averaging a rate at which beacon frames are received from an ad hoc peer.

* * * * *